US010790584B2

(12) United States Patent
Neinhues

(10) Patent No.: US 10,790,584 B2
(45) Date of Patent: Sep. 29, 2020

(54) DIRECTIONAL ANTENNA MODULE AND METHOD

(71) Applicant: Rohde & Schwarz GmbH & Co. KG, Munich (DE)

(72) Inventor: Markus Neinhues, Kirchseeon (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 553 days.

(21) Appl. No.: 15/456,200

(22) Filed: Mar. 10, 2017

(65) Prior Publication Data

US 2017/0310003 A1 Oct. 26, 2017

(30) Foreign Application Priority Data

Apr. 20, 2016 (EP) .................................. 16166220

(51) Int. Cl.
*H01Q 3/24* (2006.01)
*G01S 3/40* (2006.01)
(Continued)

(52) U.S. Cl.
CPC ............. *H01Q 3/24* (2013.01); *G01S 3/22* (2013.01); *G01S 3/40* (2013.01); *H01Q 1/48* (2013.01);
(Continued)

(58) Field of Classification Search
CPC .. H01Q 3/24; H01Q 1/48; H01Q 7/00; H01Q 9/065; H01Q 15/14; H01Q 21/062; H01Q 25/02
See application file for complete search history.

(56) References Cited

U.S. PATENT DOCUMENTS

| | | | | |
|---|---|---|---|---|
| 4,240,080 A | * | 12/1980 | Woodward | ........... H01Q 19/185 342/371 |
| 4,315,266 A | | 2/1982 | Ellis, Jr. | |

(Continued)

FOREIGN PATENT DOCUMENTS

| | | |
|---|---|---|
| CN | 203423253 U | 2/2014 |
| DE | 9002945 U1 | 9/1990 |

(Continued)

OTHER PUBLICATIONS

Extended European Search Report for European Application No. 16166220.0 (dated Oct. 11, 2016).

(Continued)

*Primary Examiner* — Dameon E Levi
*Assistant Examiner* — Jennifer F Hu
(74) *Attorney, Agent, or Firm* — Shumaker & Sieffert, P.A.

(57) ABSTRACT

The present invention relates to a directional antenna module comprising: at least one antenna array having at least two antenna elements connected to a 180-degree hybrid providing an inphase summation signal and an out-of-phase summation signal of the antenna signals received from the antenna elements and a switching element adapted to switch between the inphase summation signal and the out-of-phase summation signal output by said 180-degree hybrid in response to a direction finding mode control signal (DFM-CRTL) to provide an antenna output signal at an antenna module output of said directional antenna module. The present invention further relates to a method for direction finding of a signal source.

16 Claims, 12 Drawing Sheets

(51) Int. Cl.
*G01S 3/22* (2006.01)
*H01Q 1/48* (2006.01)
*H01Q 7/00* (2006.01)
*H01Q 15/14* (2006.01)
*H01Q 21/06* (2006.01)
*H01Q 25/02* (2006.01)
*H01Q 9/06* (2006.01)
*H01Q 9/28* (2006.01)
*H01Q 3/02* (2006.01)
*H01Q 3/40* (2006.01)

(52) U.S. Cl.
CPC ............... *H01Q 7/00* (2013.01); *H01Q 9/065* (2013.01); *H01Q 15/14* (2013.01); *H01Q 21/062* (2013.01); *H01Q 25/02* (2013.01); *H01Q 3/02* (2013.01); *H01Q 3/40* (2013.01); *H01Q 9/285* (2013.01)

(56) References Cited

U.S. PATENT DOCUMENTS

| | | | | |
|---|---|---|---|---|
| 4,319,249 A | * | 3/1982 | Evans | H01Q 21/062 |
| | | | | 343/703 |
| 4,360,816 A | * | 11/1982 | Corzine | H01Q 11/105 |
| | | | | 343/792.5 |
| 7,505,435 B2 | * | 3/2009 | Wittwer | H04B 7/0802 |
| | | | | 343/725 |
| 2007/0139285 A1 | * | 6/2007 | Maruyama | H01Q 19/10 |
| | | | | 343/741 |
| 2009/0160638 A1 | | 6/2009 | Jesme | |
| 2013/0214046 A1 | | 8/2013 | Choi et al. | |
| 2014/0049443 A1 | | 2/2014 | Katz | |
| 2014/0368317 A1 | | 12/2014 | Man | |
| 2015/0084744 A1 | | 3/2015 | Havens | |

FOREIGN PATENT DOCUMENTS

| | | |
|---|---|---|
| JP | 2010-223649 A | 10/2010 |
| WO | WO-2009/050488 A2 | 4/2009 |
| WO | WO-2011/097118 A2 | 8/2011 |
| WO | WO-2012/048452 A1 | 4/2012 |

OTHER PUBLICATIONS

Response to Communication dated Oct. 30, 2017, from counterpart European Patent Application No. 16166220.0, filed on Feb. 28, 2018, 30 pp.

* cited by examiner

DIRECTIONAL ANTENNA MODULE AND METHOD

PRIORITY CLAIM

This application claims the benefit of European Application No. 16166220.0, filed Apr. 20, 2016; the disclosure of which is incorporated herein by reference in its entirety.

FIELD OF THE INVENTION

The present invention relates to a directional antenna module and a method for direction finding of a signal source.

While direction finding for navigation purposes lost significance due to the availability of satellite navigation systems, the determining of the location of signal sources gains importance, in particular since the mobility of communications equipment increases. Another reason for the importance of direction finding lies in the fact that spread spectrum techniques are increasingly used for wireless communications. This means that the spectral components can only be allocated to a specific emitter if the direction is known. Direction finding forms therefore an indispensable step in radio detection, particularly, since reading the contents of such emissions is usually very difficult. The task of a radio direction finder is to estimate the direction of an emitter signal source by measuring and evaluating electromagnetic field parameters.

Direction finding can be performed using directional antennas. Evaluating a receive voltage of a mechanically pivoted or rotated directional antenna with reference to the direction is a possible way of performing direction finding. Here, the bearing can be derived from the characteristic of a received voltage as a function of the rotation angle. When a wave of the electromagnetic signal arrives the receive voltage can yield a directional pattern of the antenna. The pattern position relative to the antenna rotation angle is the measured bearing.

A directional antenna module can be plugged into a handle and be rotated manually by an operator until a receiver output voltage assumes an extreme value. An antenna direction can for example be read from a scale when the bearing of the received signal is determined. A conventional directional antenna module can be plugged into the handle with the correct orientation for vertical or horizontal polarization and then mechanically locked in place. After that, the plugged-in directional antenna module can be rotated by a user or operator by manually rotating the handle.

Conventional handheld directional antenna modules operate on the principle of maximum direction finding. Therefore, the user directs the antenna module with directive radiation pattern roughly in a suspected direction of an interference signal provided by a signal source and pivots the antenna module slowly back and forth until the antenna signal output by the antenna module reaches a maximum. FIG. 1 illustrates schematically a maximum direction finding as performed with a conventional handheld directional antenna module.

Since a conventional handheld directional antenna does allow only using a very compact and lightweight antenna module, the half power beam width, HPBW, in the azimuth-plane (H-plane) of such a handheld directional antenna is usually larger than 80°. In the VHF frequency range, the necessary half power beam width, HPBW, is even larger. Hence, the direction of an interference signal can be detected with an accuracy of some ten degrees only. For example, for interference hunting in cellular networks, this is not precise enough. For this kind of applications, half power beam widths being not larger than 40° in azimuth and elevation plane are required which provide an antenna gain of more than 10 dBi. Such antenna patterns can be achieved in compact size in the UHF frequency band, for instance by using Yagi-Uda antennas. However, below the UHF band, also these antennas become too large. A main drawback is that the relative bandwidth of Yagi-Uda antennas is only a few percent of the center frequency. Accordingly, with a conventional direction finding apparatus, it is necessary to use different directional antenna modules for different frequency ranges. These different antenna modules have to be plugged in by a user into the antenna handle to perform a measurement in the respective frequency range. For example, the conventional direction finding apparatus HE300 comprises a set of three exchangeable antenna modules which cover three frequency ranges. A first antenna module covers a frequency range between 20 MHz to 200 MHz, a second module covers a frequency range between 200 MHz to 500 MHz and a third antenna module covers a frequency range between 500 MHz to 7.5 GHz. The different antenna modules can be plugged into the handle by a user. Consequently, a user performing direction finding in the field needs several antenna modules in performing a measurement. Accordingly, the user is forced to carry different antenna modules along with him to the measurement point which can be cumbersome. It may even happen that a user forgets to take the necessary antenna module to the measurement point. In this case, the user has to return to get the exchangeable antenna module to perform the measurement so that precious time is wasted. In some scenarios, there may not even be enough time to get the fitting exchangeable antenna module.

SUMMARY OF THE INVENTION

Accordingly, there is a need for performing a direction finding of a signal source in a broad frequency range with a single directional antenna module.

The invention provides according to a first aspect a directional antenna module comprising: at least one antenna array having at least two antenna elements connected to a 180-degree hybrid providing an inphase summation signal and an out-of-phase summation signal of the antenna signals received from the antenna elements and a switching element adapted to switch between the inphase summation signal and the out-of-phase summation signal output by said 180-degree hybrid in response to a direction finding mode control signal to provide an antenna output signal at an antenna module output of said directional antenna module.

In a possible embodiment of the directional antenna module according to the first aspect of the present invention, the directional antenna module is switchable between a maximum direction finding mode where the inphase summation signal output by said 180-degree hybrid is switched by said switching element to the antenna module output of said directional antenna module and a minimum direction finding mode, where the out-of-phase summation signal output by said 180-degree hybrid is switched by said switching element to the antenna module output of the directional antenna module.

In a further possible embodiment of the directional antenna module according to the first aspect of the present invention, the antenna array comprises antenna elements formed by loaded loop antennas arranged in front of a reflector plate and used in a first frequency range.

In a further possible embodiment of the directional antenna module according to the first aspect of the present invention, the antenna array comprises antenna elements formed by dipole antennas arranged in front of a reflector plate and used in a second frequency range.

In a still further possible embodiment of the directional antenna module according to the first aspect of the present invention, the dipole antennas, the 180-degree hybrid and the switching element are printed on a printed circuit board.

In a further possible embodiment of the directional antenna module according to the first aspect of the present invention, the antenna array comprises antenna elements formed by LPDA antennas used in a third frequency range.

In a further possible embodiment of the directional antenna module according to the first aspect of the present invention, the switching element is a RF-switch controlled by a direction finding mode control signal coupled out by a bias-T element arranged at the antenna module output of said directional antenna module or controlled by a control button of said directional antenna module.

In a further possible embodiment of the directional antenna module according to the first aspect of the present invention, the directional antenna module is pluggable to an antenna handle comprising a bias-T element adapted to couple in the direction finding mode control signal supplied to the switching element of the directional antenna module.

In a further possible embodiment of the directional antenna module according to the first aspect of the present invention, the antenna handle comprises a module recognition unit adapted to recognize that a directional antenna module has been plugged into said antenna handle.

In a further possible embodiment of the directional antenna module according to the first aspect of the present invention, the module recognition unit of said antenna handle is adapted to recognize the type of antenna elements implemented in the at least one antenna array of the directional antenna module plugged into said antenna handle and/or adapted to recognize the at least one frequency range supported by the at least one antenna array of the plugged-in directional antenna module.

In a further possible embodiment of the directional antenna module according to the first aspect of the present invention, the directional antenna module comprises a first antenna array comprising antenna elements formed by loaded loop antennas arranged in front of a reflector plate used in a first frequency range between 100 MHz and 700 MHz and/or a second antenna array comprising antenna elements formed by dipole antennas arranged in front of a reflector plate used in a second frequency range between 700 MHz and 2.5 GHz and/or a third antenna array comprising antenna elements formed by LPDA antennas used in a third frequency range beyond 2.5 GHz.

In a further possible embodiment of the directional antenna module according to the first aspect of the present invention, the directional antenna module is switchable between different frequency ranges in response to a frequency range selection control signal.

In a further possible embodiment of the directional antenna module according to the first aspect of the present invention, each antenna array of the directional antenna module is connected to an associated 180-degree hybrid providing an inphase summation signal and an out-of-phase summation signal of the antenna signals received from the antenna elements of the respective antenna array.

In a further possible embodiment of the directional antenna module according to the first aspect of the present invention, to each 180-degree hybrid an associated switching element is connected adapted to switch between the inphase summation signal and the out-of-phase summation signal output by the respective 180-degree hybrid in response to a direction finding mode control signal to output an output signal of the respective antenna array applied to a frequency multiplexing unit of the directional antenna module.

In a further possible embodiment of the directional antenna module according to the first aspect of the present invention, a distance between the loaded loop antennas and the reflector plate of the antenna elements implemented in the first antenna array of the directional antenna module is adjustable.

In a still further possible embodiment of the directional antenna module according to the first aspect of the present invention, a distance between the dipole antennas and the reflector plate of the antenna elements implemented in the second antenna array of the directional antenna module is adjustable.

The invention provides according to a second aspect a method for direction finding of a signal source comprising: switching a directional antenna module to a maximum direction finding mode where an inphase summation signal output by a 180-degree hybrid connected to at least two antenna elements of an antenna array within said directional antenna module is output by said directional antenna module; pivoting the directional antenna module until the inphase summation signal output by the directional antenna module reaches a maximum; switching the directional antenna module to a minimum direction finding mode wherein an out-of-phase summation signal output by said 180-degree hybrid connected to the at least two antenna elements of said antenna array within the directional antenna module is output by said directional antenna module; and pivoting the directional antenna module until the out-of-phase summation signal output by the directional antenna module reaches a minimum indicating a bearing of the signal source.

Where appropriate, the above-mentioned configurations and developments can be combined in any manner. Further possible configurations, developments and implementations of the invention also include combinations, which are not explicitly mentioned, of features of the invention which have been described previously or are described in the following with reference to the embodiments. In particular, in this case, a person skilled in the art will also add individual aspects as improvements or supplements to the basic form of the present invention.

CONTENT OF THE DRAWINGS

The present invention is described in greater detail in the following on the basis of the embodiments shown in the schematic figures of the drawings, in which.

Figure 1:
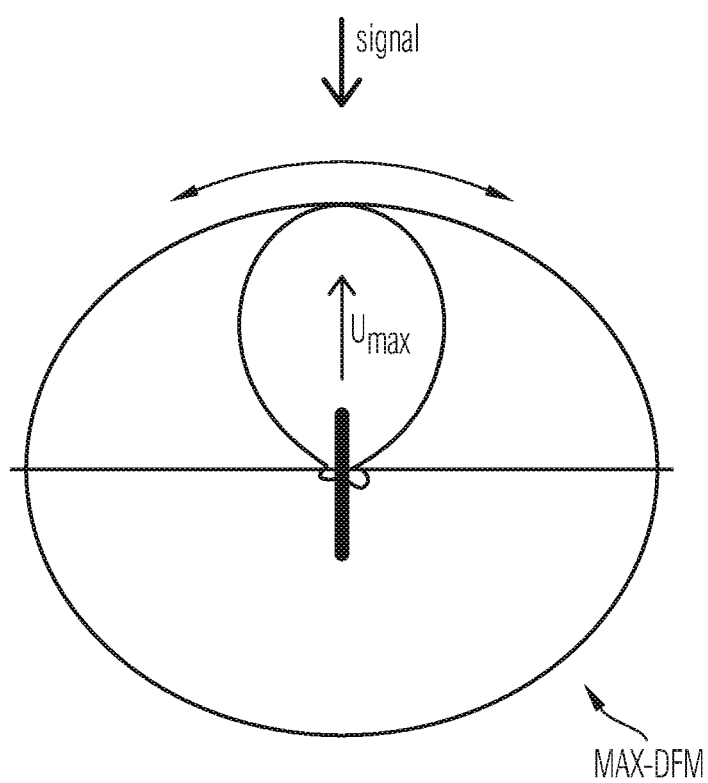
FIG. 1 shows a schematic diagram to illustrate a maximum direction finding as performed by conventional handheld directional antenna modules.

The appended drawings are intended to provide further understanding of the embodiments of the invention. They illustrate embodiments and, in conjunction with the description, help to explain principles and concepts of the invention. Other embodiments and many of the advantages mentioned become apparent in view of the drawings. The elements in the drawings are not necessarily shown to scale.

In the drawings, like, functionally equivalent and identically operating elements, features and components are provided with like reference signs in each case, unless stated otherwise.

DESCRIPTION OF EMBODIMENTS

Figure 2:
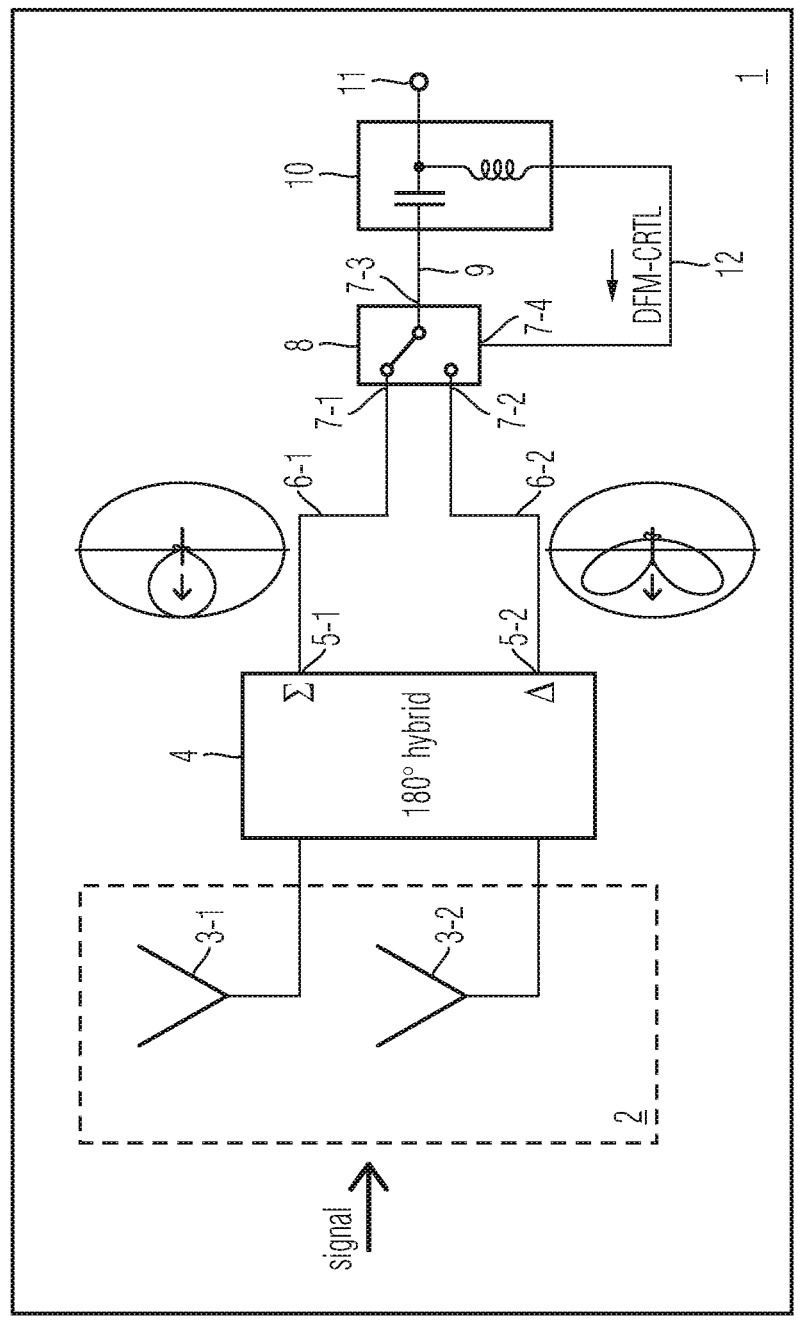
FIG. 2 shows a block diagram of a possible exemplary embodiment of a directional antenna module according to the first aspect of the present invention.

FIG. 2 shows a block diagram of a possible exemplary embodiment of a directional antenna module ac-cording to the first aspect of the present invention.

Figure 3:
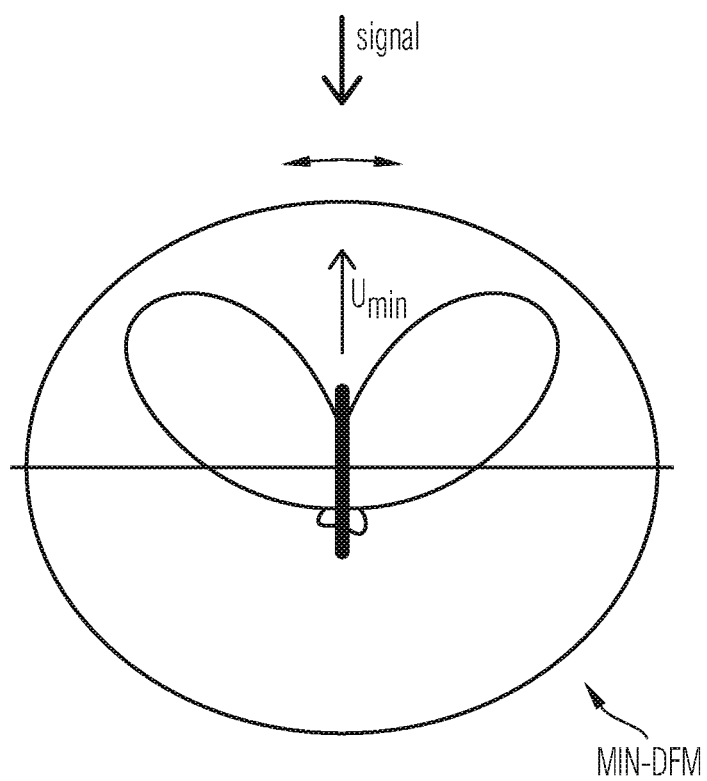
FIG. 3 shows a schematic diagram for illustrating a minimum direction finding as performed by the directional antenna module according to the first aspect in a specific operation mode.

As can be seen from FIG. 2, a directional antenna module 1 according to the first aspect of the present invention comprises in the illustrated embodiment an antenna array 2. In the illustrated embodiment of FIG. 2, the antenna array 2 is formed by a two-element array. The antenna array 2 comprises in the illustrated embodiment two antenna elements 3-1, 3-2 connected to a 180-degree hybrid circuit 4 as shown in FIG. 2. The 180-degree hybrid 4 comprises a first output 5-1 and a second output 5-2. The 180-degree hybrid 4 is adapted to generate an inphase summation signal Σ and an out-of-phase summation signal Δ of the two antenna signals received from the two antenna elements 3-1, 3-2. The antenna array 2 forms a linear two-element antenna array connected to the 180-degree hybrid circuit 4. The sum output 5-1 of the hybrid circuit 4 delivers the inphase summation signal of the two antenna signals received by the two antenna elements 3-1, 3-2. This forms a radiation pattern with a main beam in the broadside direction of the antenna array as can also be seen in FIG. 1. In contrast, the delta output 5-2 of the hybrid circuit 4 delivers the out-of-phase summation signal producing a null value in broadside direction as shown in FIG. 3. The sum output 5-1 of the 180-degree hybrid circuit 4 is connected via a first signal line 6-1 to a first input 7-1 of a switching element 8. The delta output 5-2 of the hybrid circuit 4 is connected via a signal line 6-2 to a second input 7-2 of the switching element 8 as illustrated in FIG. 2. In the illustrated embodiment, the switching element 8 is implemented by an RF-switch comprising the two input terminals 7-1, 7-2, an output terminal 7-3 and a control input 7-4. The output 7-3 of the RF-switch 8 is connected in the illustrated exemplary embodiment via a signal line 9 to a bias-T coupler 10 connected to the antenna module output 11 of the directional antenna module 1. The switching element 8 of the directional antenna module 1 as illustrated in the embodiment of FIG. 2 is adapted to switch between the inphase summation signal output at the sum output 5-1 and the out-of-phase summation signal output at the delta output 5-2 of the hybrid circuit 4 in response to a direction finding mode control signal DFM-CRTL. In the illustrated embodiment of FIG. 2, the direction finding mode control signal DFM-CRTL is applied to the control input 7-4 of the RF switching element 8 via a control signal line 12 connecting the bias-T coupler element 10 with the RF switching element 8 as illustrated in FIG. 2.

The antenna module output 11 of the directional antenna module 1 can be connected to an antenna handle comprising electronic circuits adapted to preprocess and/or process the antenna output signal of the directional antenna module 1 output by the directional antenna module 1 at the antenna module output terminal 11. In the implementation illustrated in FIG. 2, the direction finding mode control signal DFM-CRTL is received at the antenna module output 11 of the directional antenna module 1 from the antenna handle and coupled out by the bias-T coupling element 10 to control the RF switching element 8. In a possible embodiment, a bias voltage $V_{BIAS}$ supplied to an inner conductor of the RF output line is used as a switching control signal for the RF switching element 8. The bias-T coupling element 10 is configured to couple out the respective DC voltages, for instance a first DC voltage of 3 Volts and a second DC voltage of 5 Volts. Depending on the DC voltage level applied to the control input 7-4 of the RF switching element 8, the first input 7-1 or the second input 7-2 is switched to the output 7-3 of the RF switching element 8. Accordingly, the switching element 8 is adapted to switch between the inphase summation signal and the out-of-phase summation signal in response to the direction finding mode control signal DFM-CRTL applied to the control input 7-4 of the RF switching element 8. The switched-through antenna signal is output by the directional antenna module 1 at the antenna module output terminal 11. In the embodiment illustrated in FIG. 2, the direction finding mode control signal DFM-CRTL is coupled out by the bias-T element 10 arranged at the antenna module output terminal 11 of the directional antenna module 1. In an alternative embodiment, the direction finding mode control signal DFM-CRTL can also be controlled by a control button of the directional antenna module 1. In this embodiment, a user can operate the control button to switch between two different directional finding modes of the directional antenna module 1.

The directional antenna module 1 as illustrated in FIG. 2 is switchable between a maximum direction finding mode MAX-DFM and a minimum direction finding mode MIN-DFM. In the maximum direction finding mode MAX-DFM, the inphase summation signal Σ output at the sum output 5-1 by said 180-degree hybrid circuit 4 is switched by the switching element 8 to the antenna module output terminal 11 of the directional antenna module 1. In the minimum direction finding mode MIN-DFM, the out-of-phase summation signal Δ output at the delta output 5-2 of the 180-degree hybrid circuit 4 is switched by the switching element 8 to the antenna module output terminal 11 of the directional antenna module 1. Accordingly, the directional antenna module 1 provides a combined maximum and minimum localization. In a preferred embodiment, the maximum and minimum of the antenna radiation pattern points in the same angular direction so that no scanning of the antenna is required. In the embodiment illustrated in FIG. 2, the change between the maximum and minimum pattern takes place electronically, e.g. by pressing a button on the antenna handle connected to the directional antenna module 1. In an alternative embodiment, the control button can also be arranged directly at the directional antenna module 1. The directional antenna module 1 as illustrated in FIG. 2 is first operated in the maximum direction finding mode MAX-DFM to find a proximate direction range of a signal emitter or radiation source. Accordingly, the directional antenna module 1 is first switched to the maximum direction finding mode MAX-DFM where the inphase summation signal Σ output by the 180-degree hybrid circuit 4 connected to the antenna elements 3-1, 3-2 of the antenna array 2 is output by the directional antenna module 1 to the antenna handle. The directional antenna module 1 plugged into the antenna handle is then pivoted by the user until the inphase summation signal Σ output by the directional antenna module 1 reaches a maximum. After the proximate bearing of the signal source has been found in this manner, the directional antenna module 1 is switched by the user to a minimum direction finding mode MIN-DRM, for instance by pressing a control button at the antenna handle or a control button at the antenna module 1 wherein an out-of-phase summation signal Δ output by the 180-degree circuit 4 connected to the at least two antenna elements 3-1, 3-2 of the antenna array 2 is output by the directional antenna module 1 to the antenna handle. After having switched the directional antenna module 1 to the minimum direction finding mode MIN-DFM, the user can pivot the directional antenna module 1 until the out-of-phase summation signal Δ output by the directional antenna module 1 to the antenna handle reaches a minimum indicating a bearing of the signal source. The bearing can be measured with an accuracy of even less than 1 degree.

FIG. 1 illustrates a maximum direction finding performed by the directional antenna module 1 in the maximum direction finding mode MAX-DFM. A user directs the directional antenna module 1 comprising a directive radiation pattern roughly in the suspected direction of the interference signal generated by the signal source and pivots the directional antenna module 1 slowly back and forth until the signal reaches a maximum. Afterwards, the user switches the directional antenna module 1 to the minimum direction finding mode MIN-DFM as illustrated in FIG. 3. In the minimum direction finding mode MIN-DFM, the directional antenna module 1 is put in an operation state where the minimum of the radiation pattern shows the direction of the signal source or of a transmitter as illustrated in FIG. 3. The minimum direction finding mode MIN-DFM makes use of the effect that near its null position an antenna produces larger changes in the current than similar angular changes near the antenna maximum position produce. Consequently, the direction finding using the minimum of the radiation pattern is more precise than performing maximum direction finding. The antenna radiation pattern exhibits in a preferred embodiment only one maximum to avoid ambiguity. In a possible implementation, the minimum-to-maximum ratio can be at least 20 dB. With the directional antenna module 1 according to the first aspect of the present invention, the measurement of the bearing of the signal source is performed sequentially in two measurement stages. First, a maximum direction finding measurement is performed in a maximum direction finding mode MAX-DFM of the antenna module 1 and then a minimum direction finding measurement is performed in a minimum direction finding mode MIN-DFM of the directional antenna module 1.

Figure 4:
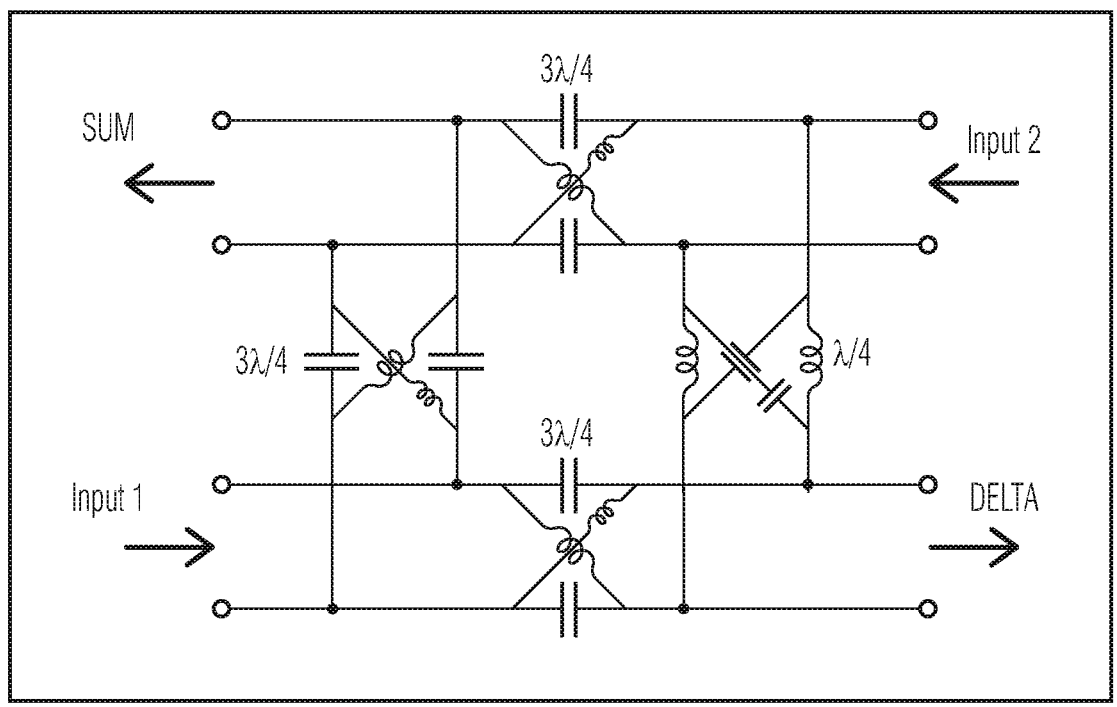
FIG. 4 shows a circuit diagram of a possible exemplary implementation of a 180-degree hybrid within a directional antenna module according to the first aspect of the present invention.

FIG. 4 shows a circuit diagram of a possible exemplary embodiment of a 180-degree hybrid circuit 4 which can be used in a possible embodiment of the direction antenna module 1 according to the first aspect of the present invention. In an alternative embodiment, another 180-degree hybrid circuit 4 can be used as well. In the illustrated embodiment of FIG. 4, the 180-degree circuit 4 is based on lumped circuit elements. These are arranged in a symmetrical lattice structure as illustrated in FIG. 4. The elements of the 180-degree hybrid circuit 4 can be printed in a preferred embodiment on a printed circuit board PCB.

Figure 5:
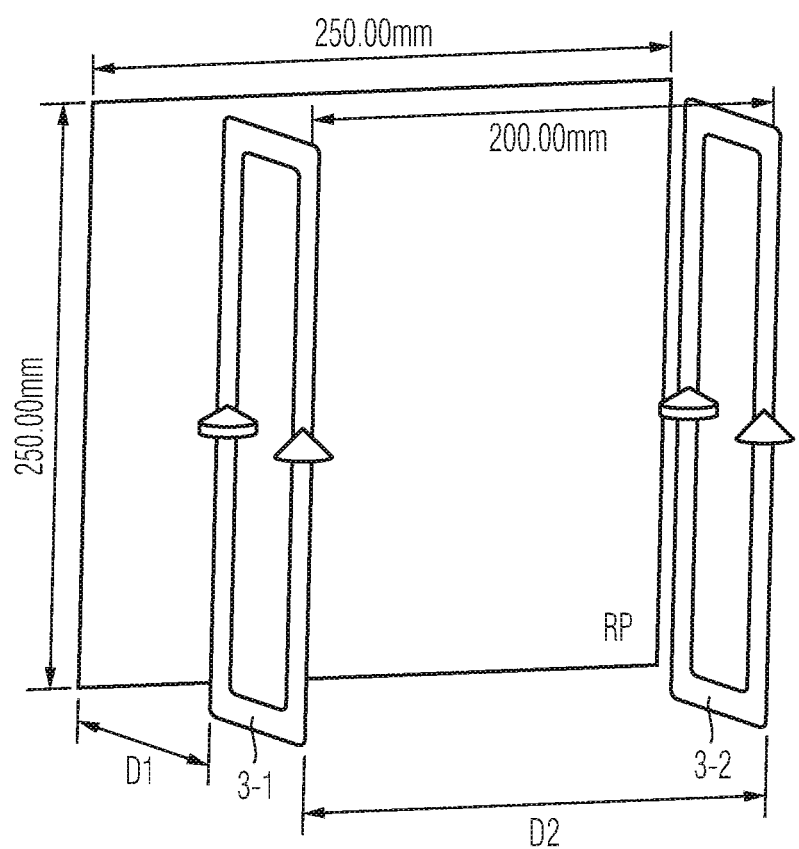
FIG. 5 shows schematically a possible implementation of an antenna element used in an antenna array of the directional antenna module according to the first aspect of the present invention.
Figure 7A:
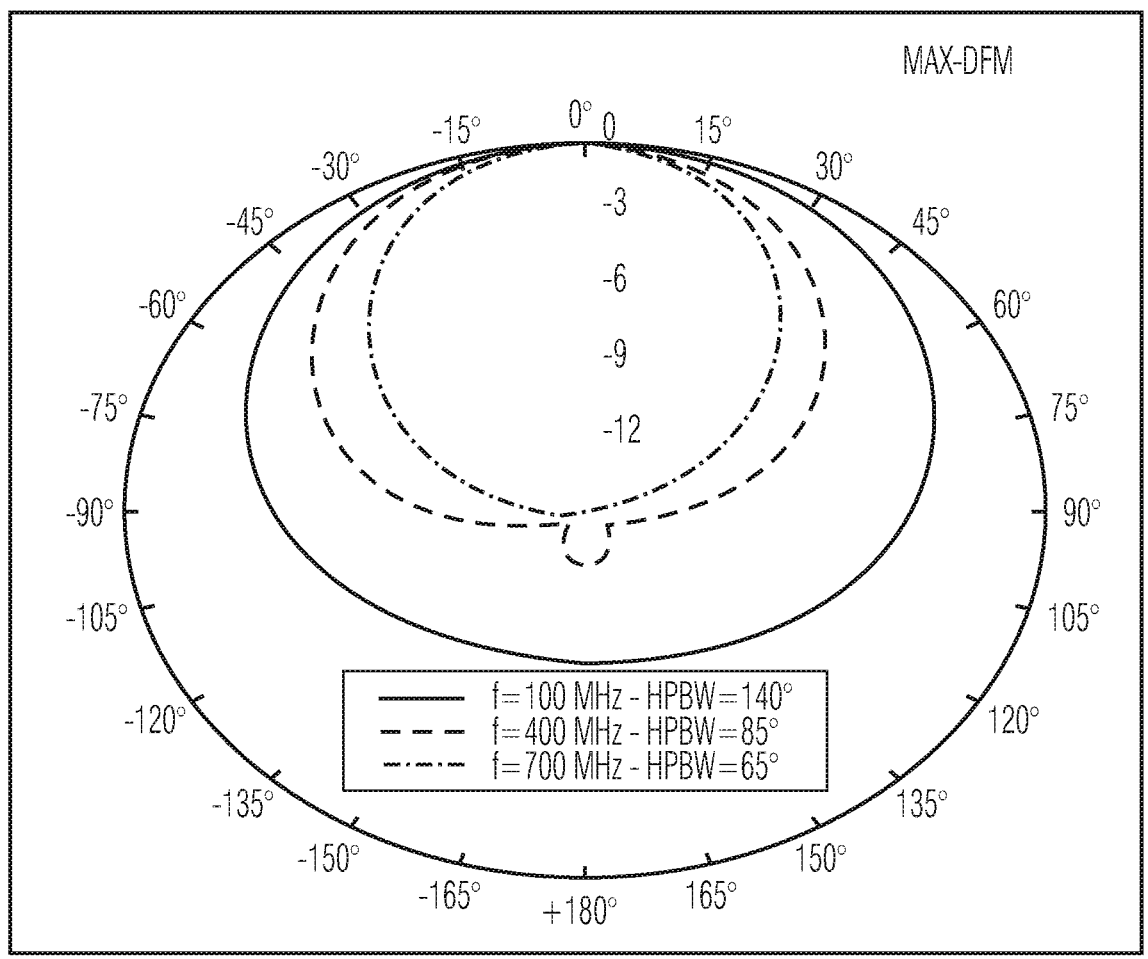
FIGS. 7A, 7B illustrate measured radiation patterns provided by an antenna array within a directional antenna module according to the first aspect of the present invention in a first frequency range in different operation modes.
Figure 7B:
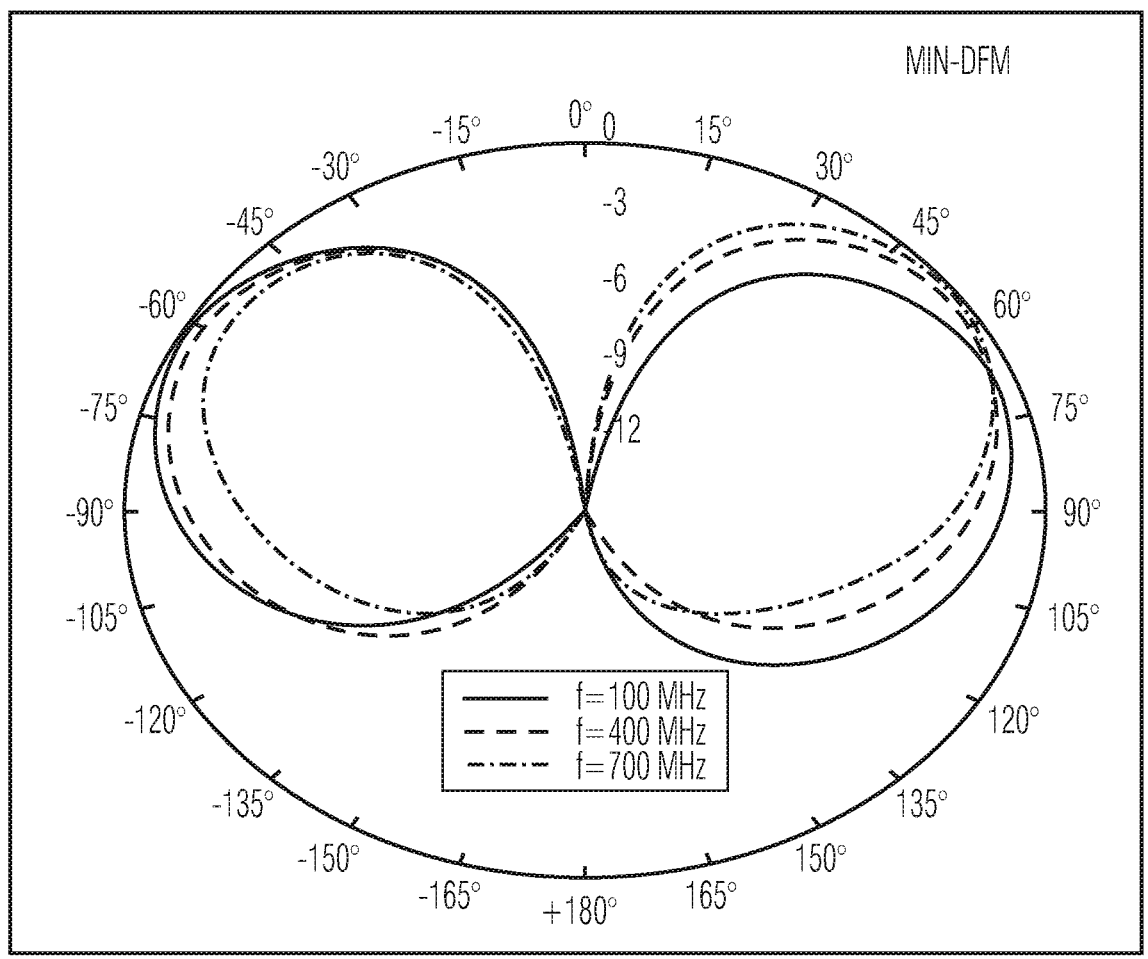

In a possible embodiment, the directional antenna module 1 comprises an antenna array 2 which has antenna elements formed by loaded loop antennas arranged in front of a reflector plate and used in a first low frequency range. FIG. 5 illustrates a possible exemplary implementation of such an antenna array 2 comprising at least two antenna elements 3-1, 3-2 each formed by loaded loop antennas arranged in front of a reflector plate at a distance D1. The antenna array 2 illustrated in FIG. 5 can be used in a first low frequency range, for instance in a frequency range between 100 MHz and 700 MHz. FIGS. 7A, 7B illustrate the corresponding measured radiation patterns in the first frequency range, i.e. between 100 MHz and 700 MHz, in the H-plane. FIG. 7A illustrates the measured radiation pattern in the maximum direction finding mode MAX-DFM while FIG. 7B illustrates the measured radiation pattern in the first frequency range in the minimum direction finding mode MIN-DFM of the directional antenna module 1. In the first frequency range, antenna elements 3-1, 3-2 are used which comprise already a predetermined directivity to generate a unique main lobe. The antenna elements 3-1, 3-2 used for the first frequency range are loaded loop antennas arranged in front of the reflector plate as shown in FIG. 5. In the illustrated implementation, the reflector plate is a square reflector plate RP having a dimension of 250 to 250 mm. In the illustrated embodiment, the loaded loop antenna elements 3-1, 3-2 are rectangular loops located in front of the reflector plate RP at a distance D1. In a possible implementation, the distance D1 is fixed. In an alternative implementation, the distance D1 can be adjustable. The two loop antenna elements 3-1, 3-2 are spaced apart at a distance D2 as illustrated in FIG. 5. In the illustrated implementation, the distance D2 between the two loaded loop antennas 3-1, 3-2 can be 200 mm. The two loaded loop antennas 3-1, 3-2 exhibit a tiny directivity. The distance D2 between the two antenna elements 3-1, 3-2 is in the illustrated implementation 200 mm which is electrically small for the lower frequency. Hence, in a maximum direction finding mode MAX-DFM, no array gain can be expected from the loaded loop antennas alone. Therefore, the loaded loop antennas 3-1, 3-2 are arranged in front of the reflector plate RP, which acts only for the higher frequencies in the respective frequency band, i.e. the first frequency range. The measured radiation patterns in the H-plane for the maximum direction finding mode MAX-DFM are illustrated in FIG. 7A and the measured radiation patterns in the H-plane for the minimum direction finding mode MIN-DFM are illustrated in FIG. 7B. While the half power beam width HPBW in the maximum direction finding mode MAX-DFM varies between 140° and 65°, the half power beam width HPBW of the null value in the minimum direction finding mode MIN-DFM as illustrated in FIG. 7B is substantially constant around a maximum value of 25°. A practical gain starts with −25 dBi at the lower end of the frequency band and increases to 2 dBi at the upper edge. The directivity varies between 5 dBi and 7 dBi in the maximum direction finding mode as can be seen from FIGS. 7A, 7B. In the illustrated embodiment of FIG. 5, the loaded loop antennas 3-1, 3-2 have a rectangular shape. The loaded loop antennas 3-1, 3-2 can also have different forms, e.g. circular or triangular.

Figure 6:
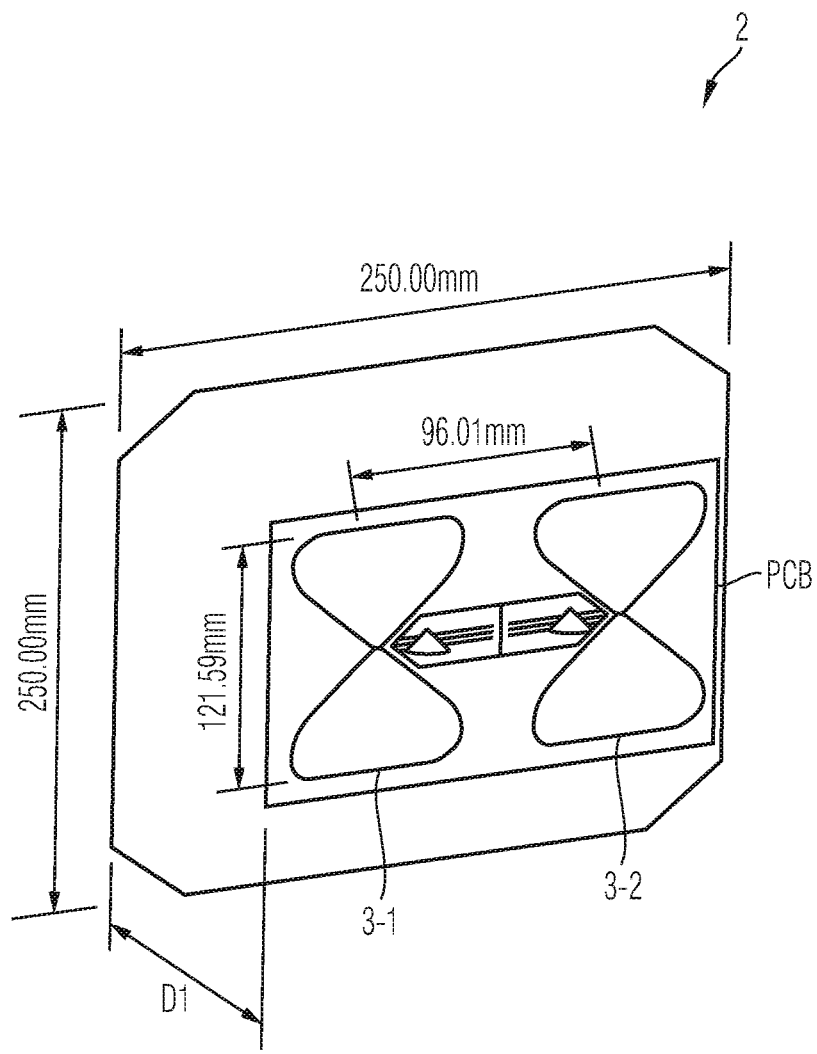
FIG. 6 shows a further possible implementation of an antenna element used in an antenna array of the directional antenna module according to the first aspect of the present invention.

In a further possible embodiment of the directional antenna module 1 according to the first aspect of the present invention, the antenna array 2 can comprise antenna elements 3-1, 3-2 formed by dipole antennas arranged in front of a reflector plate and used in a second frequency range. The second frequency range can be in a possible embodiment a frequency range between 700 MHz and 2.5 GHz. FIG. 6 illustrates a possible exemplary implementation of an antenna array 2 of the directional antenna module 1 comprising an antenna array 2 having antenna elements 3-1, 3-2 formed by dipole antennas arranged in front of a reflector plate RP used in a second frequency range between 700 MHz and 2.5 GHz. This frequency range is typically used by mobile communication networks such as GSM, UMTS or LTE. In the illustrated implementation of FIG. 6, the dipole antennas 3-1, 3-2 of the antenna array 2, the 180-degree hybrid circuit 4 and even the switching element 8 can be printed on a common printed circuit board PCB as illustrated in FIG. 6. The printed circuit board PCB is placed in front of the reflector plate RP at a distance D1. The distance D1 is in a possible embodiment fixed. In an alternative embodiment, the distance D1 between the printed circuit board PCB and the reflector plate RP can be adjustable. In the illustrated implementation, the printed circuit board PCB has a dimension of 121.6 mm 96 mm. The reflector plate RP is a square reflector plate having the dimensions 250 mm to 250 mm. The 180-degree hybrid circuit 4 can be printed in the center of the printed circuit board between the two dipole antennas 3-1, 3-2. In the illustrated embodiment, the dipole antennas 3-1, 3-2 are both formed by two conical shaped dipole half areas. Between two dipole half areas, a small gap is provided as illustrated in FIG. 6. The dipole half areas of an antenna element 3-*i* are connected to a differential input of the 180-degree hybrid circuit 4. In a possible implementation, the 180-degree hybrid circuit 4 connected to the two dipole antennas 3-1, 3-2 printed on the printed circuit board PCB is implemented as illustrated in FIG. 4. The output terminal, i.e. the terminals 5-1, 5-2, of the 180-degree hybrid circuit 4 can be connected to a RF switching element 8 which can be also printed or arranged on the printed circuit board PCB of the antenna array 2. This RF switching element 8 implemented on the printed circuit board PCB can be connected via a coax cable to the output module terminal 11 of the directional antenna module 1 directly or via a bias-T coupling element 10.

The reflector plates RP of the antenna arrays 2 as illustrated in the embodiments of FIGS. 5, 6 are made in a preferred embodiment of an electric conductive material.

Figure 8A:
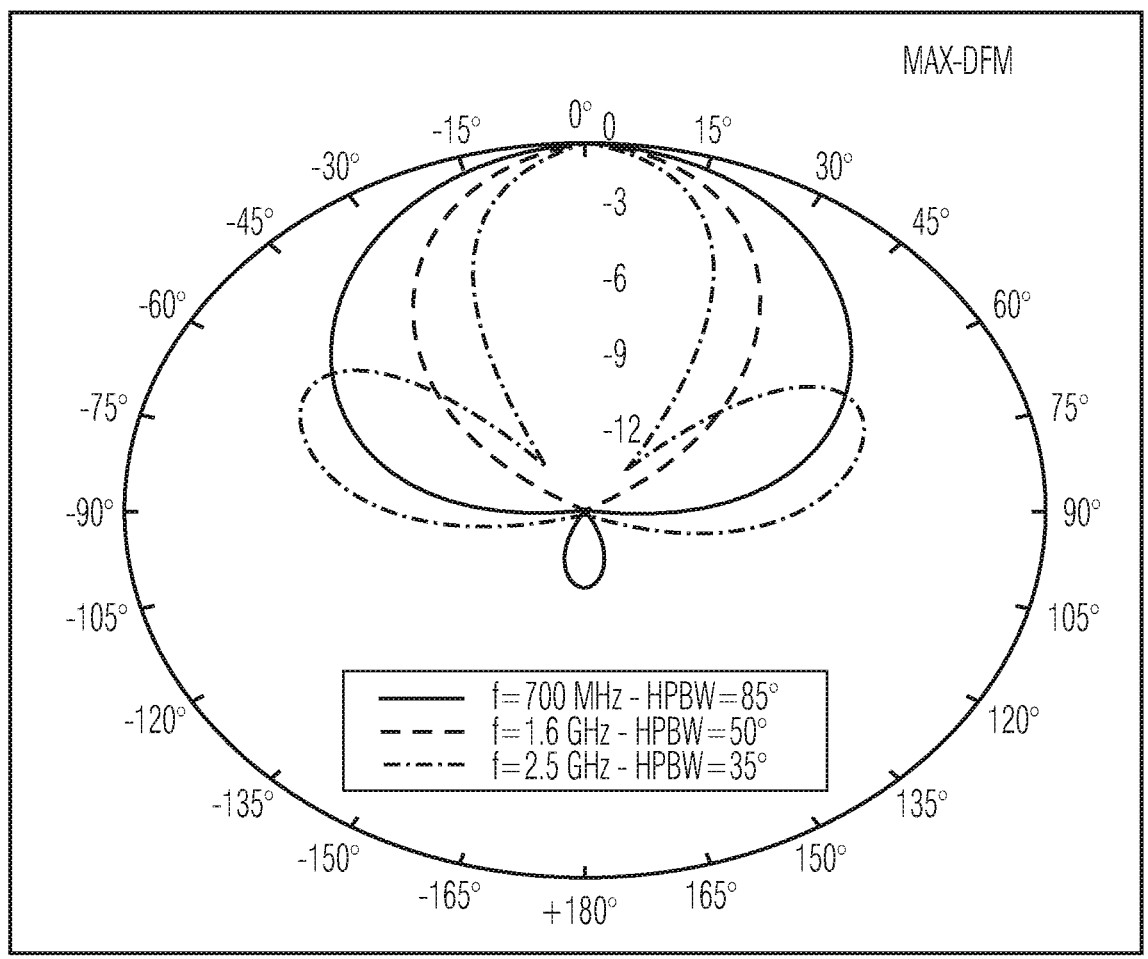
FIGS. 8A, 8B illustrate measured radiation patterns provided by an antenna array within a directional antenna module according to the first aspect of the present invention in different operation modes.
Figure 8B:
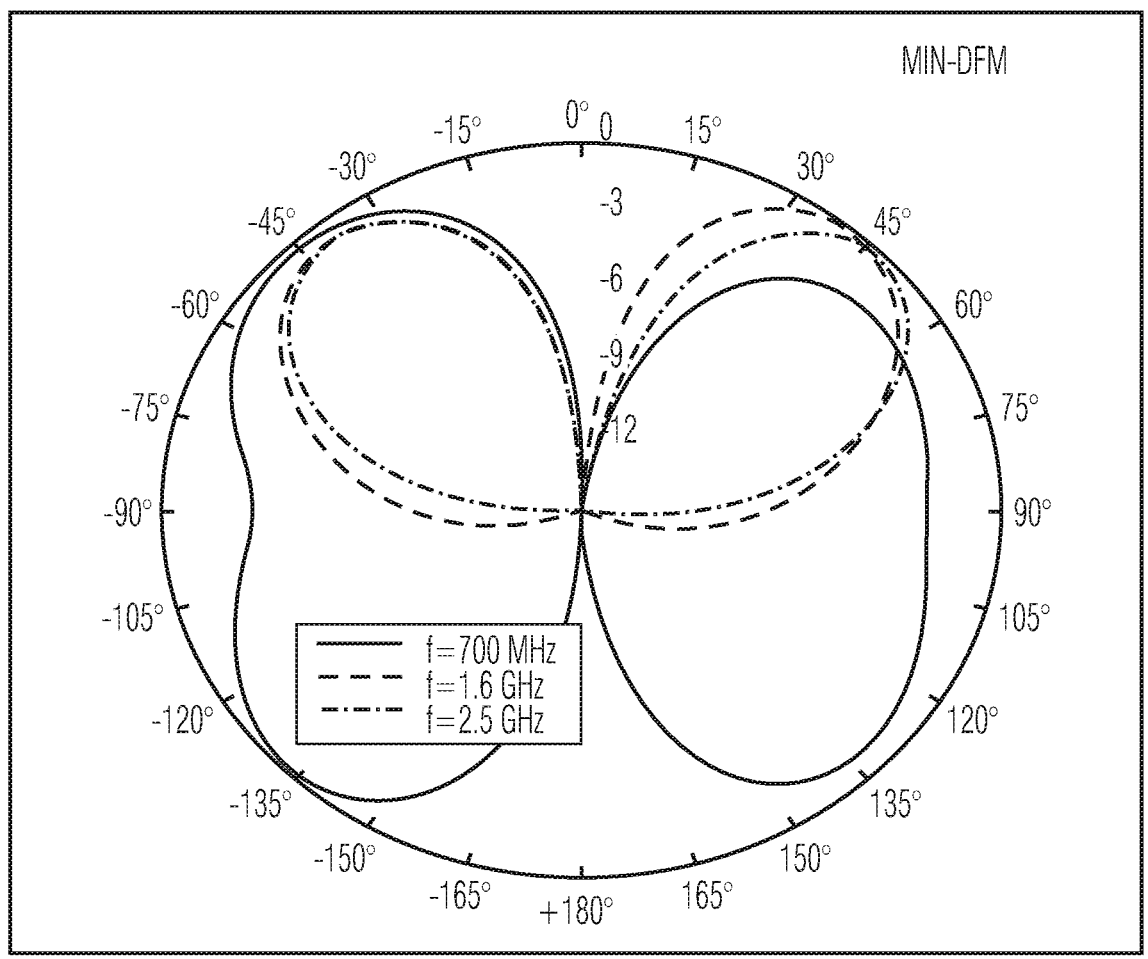

FIGS. 8A, 8B illustrate the measured radiation patterns of an antenna array 2 as illustrated in FIG. 6 in a second frequency range between 0.7 GHz and 2.5 GHz in the H-plane. FIG. 8A illustrates the measured radiation pattern in the maximum direction finding mode MAX-DFM and FIG. 8B illustrates the measured radiation pattern in the minimum direction finding mode MIN-DFM of the directional antenna module 1. For the second higher frequency range, the two-element dipole array 2 as illustrated in FIG. 6 can be used. The antenna elements 3-1, 3-2 can be arranged at a distance of 100 mm in front of the reflector plate RP. The reflector plate RP is used to align the main lobe forward.

The measured radiation patterns in the H-plane for both operation modes are illustrated in FIGS. 8A, 8B. While the half power beam width HPBW in the maximum direction finding mode MAX-DFM varies between 85° and 35°, the half power beam width HPBW of the null value in the minimum direction finding mode MIN-DFM is substantially constant around maximally 20°. In a possible implementation, the gain in the entire frequency range is around 5 dBi and the directivity varies between 7 dBi and 10 dBi in the maximum direction finding mode. In a possible implementation, the weight of the antenna module 1 including all mechanical parts and the housing of the antenna module 1 is less than 0.6 kg.

In a further possible embodiment, the directional antenna module 1 comprises an antenna array 2 having antenna elements formed by LPDA antennas used in a third frequency range beyond 2.5 GHz.

The directional antenna module 1 is pluggable to an antenna handle 13 handheld by a user. The antenna handle 13 can comprise a module recognition unit 14 adapted to recognize that a directional antenna module 1 has been plugged into the antenna handle. In a possible embodiment, the module recognition unit 14 of the antenna handle 13 is adapted to recognize the type of antenna elements 3-1, 3-2 implemented in the at least one antenna array 2 of the directional antenna module 1 plugged into the antenna handle 13. In a further possible embodiment, the module recognition unit 14 is further adapted to recognize the at least one frequency range supported by the at least one antenna array 2 of the plugged-in directional antenna module 1. The antenna handle 13 can comprise in a possible implementation a user interface adapted to display to the user that a recognized directional antenna module 1 has been plugged successfully into the antenna handle. The user interface can display in a further embodiment frequency ranges supported by the plugged-in directional antenna module 1. For instance, the user interface can display to the user whether one, two or three frequency ranges FR are supported by the directional antenna module 1 each ranging from a first frequency to a second frequency.

In a possible embodiment, the directional antenna module 1 comprises two antenna arrays, i.e. a first antenna array 2-1 comprising antenna elements 3.*i* formed by loaded loop antennas arranged in front of a reflector plate RP used in a first frequency range, e.g. between 100 MHz and 700 MHZ, and a second antenna array 2-2 comprising antenna elements 3-*i* formed by dipole antennas arranged in front of a reflector plate RP used in a second frequency range, e.g. between 700 MHz and 2.5 GHz.

In a further possible alternative embodiment, the directional antenna module 1 can comprise three different antenna arrays. In this embodiment, the directional antenna module 1 can comprise a first antenna array 2-1 with antenna elements 3-*i* formed by loaded loop antennas, a second antenna array 2-2 comprising antenna elements 3-*i* formed by dipole antennas and a third antenna array 2-3 comprising antenna elements 3-*i* formed by LPDA antennas. The third antenna array 2-3 can be used in a third frequency range, e.g. beyond a frequency of 2.5 GHz.

In a possible embodiment, the directional antenna module 1 can be switched between different frequency ranges FR in response to a frequency range selection control signal FRS- CRTL. The directional antenna module 1 can be switched in response to the frequency range selection signal FRS-CRTL between the first frequency range, the second frequency range and/or the third frequency range. In a possible implementation, the frequency range selection signal can be generated electronically by a circuit within the antenna handle 13 and supplied via the antenna signal line to the plugged-in directional antenna module 1. The supplied frequency selection signal can be coupled out by a decoupling electronic element to select one of the different antenna arrays 2 implemented in the directional antenna module 1. Each antenna array 2 implemented in the directional antenna module 1 is connected in a preferred embodiment to an associated 180-degree hybrid circuit 4 providing an inphase summation signal $\Sigma$ and an out-of-phase summation signal $\Delta$ of the antenna signals received from the antenna elements 3-$i$ of the respective antenna array 2. For each 180-degree hybrid circuit 4-$i$ of the directional antenna module 1, an associated switching element 8-$i$ can be connected being adapted to switch between the inphase summation signal and the out-of-phase summation signal $\Delta$ output by the respective 180-degree hybrid circuit 4 in response to a direction finding mode control signal DFM-CRTL to output an output signal of the respective antenna array 2 which can be applied to a frequency multiplexing unit 12 of the directional antenna module 1.

Figure 9:
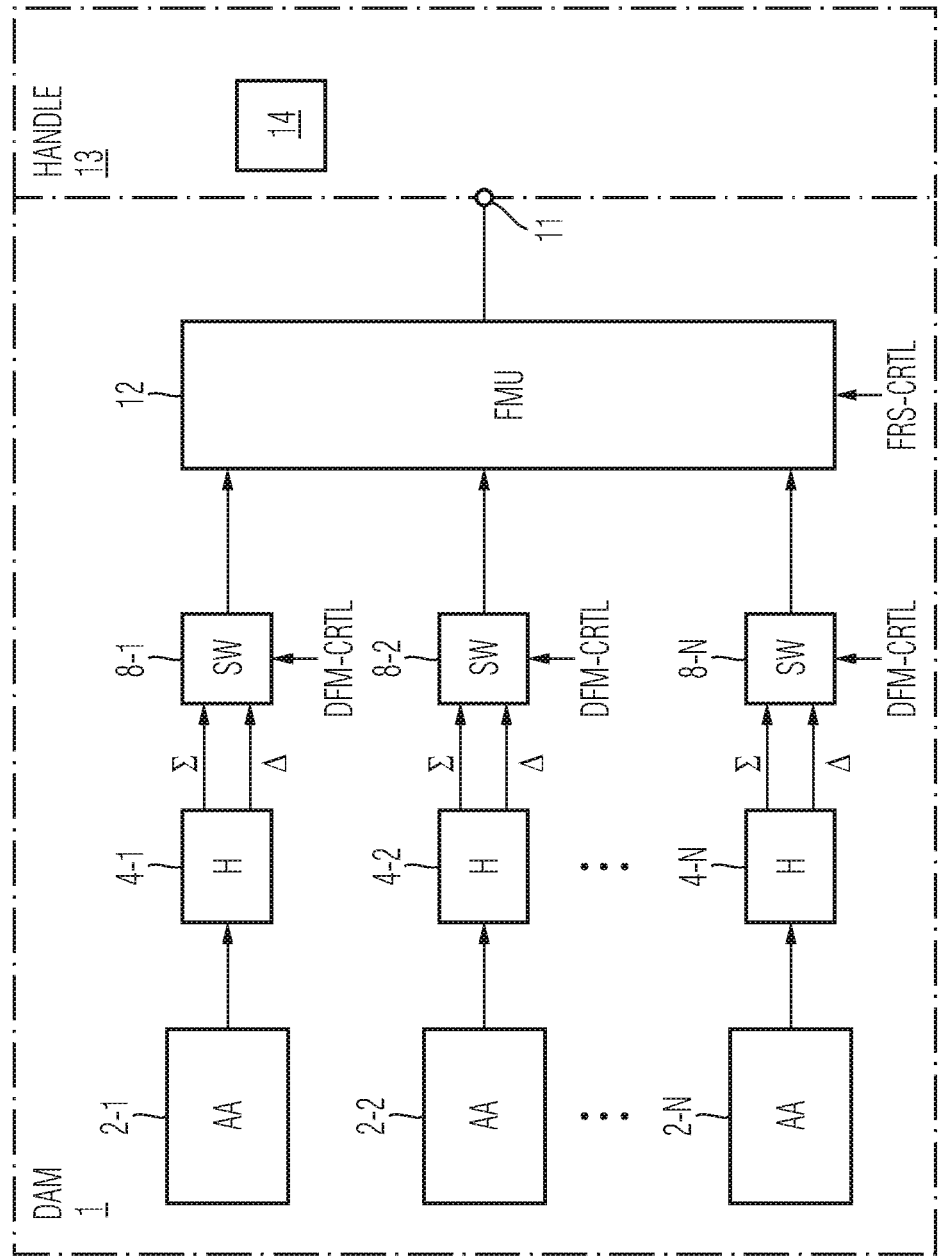
FIG. 9 shows a schematic block diagram of a possible further embodiment of a directional antenna module according to the first aspect of the present invention.

FIG. 9 shows a block diagram of a possible exemplary embodiment of a directional antenna module 1 according to the first aspect of the present invention. In the illustrated embodiment, the directional antenna module 1 comprises a number of antenna arrays 2-1, 2-2 . . . 2-$n$ each provided for specific frequency ranges. In a possible embodiment, different frequency ranges FRs can slightly overlap each other. The number N of antenna arrays 2-$i$ can vary depending on the application. Each antenna array 2-$i$ of the directional antenna module 1 as illustrated in FIG. 9 is connected to an associated 180-degree hybrid circuit 4-$i$. Accordingly, in the illustrated embodiment, the number of the 180-degree hybrid circuits 4-$i$ corresponds to the number of implemented antenna arrays 2-$i$. To each 180-degree hybrid circuit 4-$i$ an associated switching element 8-$i$ is connected. The associated switching element 8-$i$ is adapted to switch between the inphase summation signal $\Sigma$ and the out-of-phase summation signal $\Delta$ output by the respective 180-degree hybrid circuit 4-$i$ in response to a direction finding mode control signal DFM-CRTL as illustrated in FIG. 9. The selected output signal of the respective antenna array 2-$i$ is applied by the switching element 8-$i$ to a frequency multiplexing unit 12 as shown in FIG. 9. The frequency range output by the frequency multiplexing unit 12 to the output terminal 11 of the directional antenna module 1 can be selected in response to a frequency range selection control signal FRS-CRTL as shown in FIG. 9. As shown in FIG. 9, the output terminal 11 of the directional antenna module 1 is connected to an antenna handle 13. In a possible implementation, the antenna handle 13 can comprise a module recognition unit 14 adapted to recognize the type of antenna elements implemented in the antenna arrays 2-$i$ of the directional antenna module 1. The module recognition unit 14 can be further adapted to recognize the at least one frequency range FR supported by the different antenna arrays 2-$i$ of the plugged-in directional antenna module 1.

The antenna handle 13 as shown in FIG. 9 can comprise a low-noise wideband amplifier which can be activated to enhance the sensitivity of the apparatus. In a passive operation mode, the low-noise wideband amplifier is bypassed so that the direction finding apparatus can also be used in the vicinity of strong signal sources. The antenna handle 13 can comprise in a possible implementation also an analog compass for bearing determination or can be equipped with an integrated GPS receiver and an electronic compass. In a possible implementation, when used with a portable receiver a potential target source can be located on a map using triangulation. The antenna handle 13 can comprise a further interface to a mobile device such as a smartphone or a tablet. The handle 13 can comprise buttons for selecting the different operation modes of the directional antenna module 1 as shown in FIG. 9. The selection buttons provided at the user interface of the antenna handle 13 can be used to select a direction finding mode DFM and/or to select a specific frequency range FR. The low-noise amplifier within the antenna handle 13 can be supplied in a specific implementation with power by a receiver.

Figure 10:
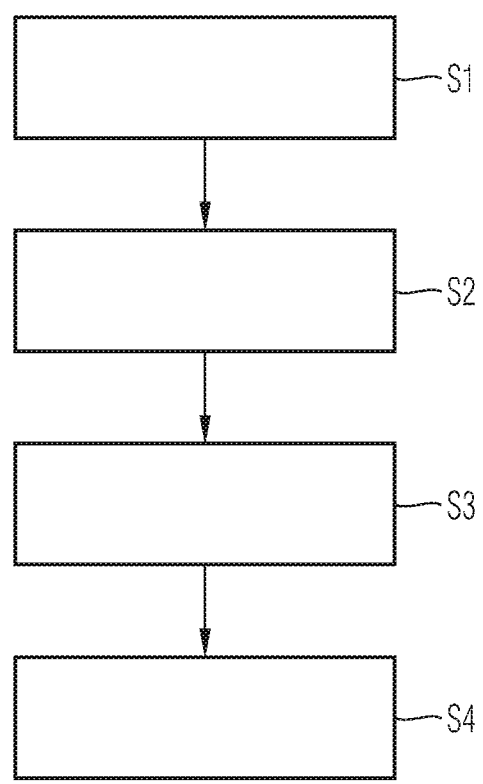
FIG. 10 shows a flowchart of a possible exemplary embodiment of a method for direction finding of a signal source according to the second aspect of the present invention.

FIG. 10 illustrates a flowchart of a specific exemplary embodiment of a method for direction finding of a signal source according to the second aspect of the present invention.

In a first step S1, the directional antenna module 1 is switched to a maximum direction finding mode MAX-DFM where an inphase summation signal $\Sigma$ output by a 180-degree hybrid connected to at least two antenna elements of the antenna array 2 within the directional antenna module 1 is output by the directional antenna module 1.

In a further step S2, the directional antenna module 1 is pivoted by the user until the inphase summation signal $\Sigma$ output by the directional antenna module 1 reaches a maximum.

Then, the directional antenna module 1 is switched in step 3 to a minimum direction finding mode MIN-DFM by the user or automatically if a signal maximum has been recorded. In the minimum direction finding mode MIN-DFM, the out-of-phase summation signal $\Delta$ output by the 180-degree hybrid connected to the at least two antenna elements of the antenna array within the directional antenna module 1 is output by the directional antenna module 1.

Finally, in step S4, the directional antenna module 1 is pivoted by the user until the out-of-phase summation signal $\Delta$ output by the directional antenna module 1 reaches a minimum which indicates a bearing of a target signal source.

The bearing can be output by a user interface of the antenna handle 13 to the user. In an alternative embodiment, the bearing of the target signal source can be supplied to a data processing unit for further processing. The directional antenna module 1 provides a measurement with a high accuracy and high sensitivity. The directional antenna module 1 is immune to field distortions caused by multipath propagation and/or to polarization errors. The directional antenna module 1 provides a relative high scanning speed and a high probability of intercept POI. In a possible embodiment, the directional antenna module 1 can be a handheld module plugged into an antenna handle 13 as illustrated in FIG. 9. The directional antenna module 1 can be also portable by a vehicle or any other mobile device. In a preferred embodiment, the rotation or pivoting of the directional antenna module 1 is performed by a user. In a further possible embodiment, pivoting or rotation of the directional antenna module 1 can be performed automatically by a rotation device to which the directional antenna module 1 is plugged. In a possible implementation, a fine tuning can be performed by adjusting the distances of the reflector plates and the antenna elements 3-$i$ used in the different antenna arrays 2. Further, in a possible implementation, the rotation speed for rotating the directional antenna module 1 can be adjusted depending on the implemented antenna elements of the different antenna arrays 2. The directional antenna module 1 can be used in a wide range of applications comprising radio monitoring, security services, intelligence, communication systems and research.

Although the present invention has been described in the above by way of preferred embodiments, it is not limited thereto, but rather can be modified in a wide range of ways. In particular, the invention can be changed or modified in various ways without deviating from the core of the invention.

The invention claimed is:

1. A directional antenna module, the module comprising:
   a first antenna array comprising at least two antenna elements connected to a 180-degree hybrid providing an inphase summation signal and an out-of-phase summation signal of the antenna signals received from the at least two antenna elements and
   a switching element adapted to switch between the inphase summation signal and the out-of-phase summation signal output by said 180-degree hybrid in response to a direction finding mode control signal (DFM-CRTL) to provide an antenna output signal at an antenna module output of said directional antenna module,
   wherein said antenna elements are formed by loaded loop antennas arranged in front of a first reflector plate and used in a first frequency range, and
   wherein said antenna elements comprise a predetermined directivity to generate a main lobe and said first reflector plate is a square reflector plate, and
   a second antenna array comprising second antenna elements formed by dipole antennas arranged in front of a second reflector plate and used in a second frequency range.

2. The module of claim 1, wherein said directional antenna module is switchable between a maximum direction finding mode where the inphase summation signal output of said 180-degree hybrid is switched by said switching element to the antenna module output of said directional antenna module and wherein a minimum direction finding mode, where the out-of-phase summation signal output of said 180-degree hybrid is switched by said switching element to the antenna module output of said directional antenna module.

3. The module of claim 1,
   wherein the 180-degree hybrid is a first 180-degree hybrid and the switching element is a first switching element,
   wherein the dipole antennas are connected to a second 180-degree hybrid providing an inphase summation signal and an out-of-phase summation signal of the antenna signals from the dipole antennas, and a second switching element adapted to switch between the inphase summation signal and the out-of-phase summation signal output by the second 180-degree hybrid in response to the direction finding mode control signal (DFM-CRTL), and
   wherein the dipole antennas, the second 180-degree hybrid and the second switching element are printed on a printed circuit board.

4. The module of claim 1, the directional antenna module further comprises a third antenna array comprising third antenna elements formed by LPDA antennas used in a third frequency range.

5. The module of claim 1, wherein said switching element is a RF-switch controlled by the directional finding mode control signal coupled out by a bias-T element arranged at the antenna module output of said directional antenna module or controlled by a control button of said directional antenna module.

6. The module of claim 1, wherein the directional antenna module is pluggable to an antenna handle comprising a bias-T element adapted to couple in the directional finding mode control signal (DFM-CRTL) supplied to the switching element of the directional antenna module.

7. The module of claim 6, wherein said antenna handle comprises a module recognition unit adapted to recognize that a directional antenna module has been plugged to said antenna handle.

8. The directional antenna module according to claim 7, wherein the module recognition unit of said antenna handle is adapted to recognize the type of antenna elements implemented in the first antenna array and the second antenna array of the directional antenna module plugged into said antenna handle.

9. The directional antenna module according to claim 7, wherein the module recognition unit of said antenna handle is adapted to recognize the at least one frequency range supported by the first antenna array and the second antenna array of the plugged-in directional antenna module.

10. The module of claim 1,
    wherein the first frequency range is between 100 MHz and 700 MHz the second frequency range between 700 MHz and 2.5 GHz; and wherein the directional antenna module further comprises:
    a third antenna array comprising antenna elements formed by LPDA antennas used in a third frequency range beyond 2.5 GHz.

11. The module of claim 10, wherein each antenna array of said directional antenna module is connected to an associated 180-degree hybrid providing an inphase summation signal and an out-of-phase summation signal of the antenna signals received from the antenna elements of the respective antenna array.

12. The module of claim 11, wherein to each 180-degree hybrid an associated switching element is connected adapted to switch between the inphase summation signal and the out-of-phase summation signal output by the respective 180-degree hybrid in response to the direction finding mode control signal (DFM-CRTL) to output an output signal of the respective antenna array applied to a frequency multiplexing unit of said directional antenna module.

13. The module of claim 1, wherein the directional antenna module is switchable between different frequency ranges in response to a frequency range selection control signal (FRS-CRTL).

14. The module of claim 1, wherein a distance between the loaded loop antennas and the first reflector plate of the antenna elements implemented in the first antenna array of the directional antenna module is adjustable.

15. The module of claim 1, wherein a distance between the dipole antennas and the second reflector plate is adjustable.

16. A method for direction finding of a signal source, the method comprising:
    switching a directional antenna module in response to a direction finding mode control signal (DFM-CRT L) to a maximum direction finding mode, wherein an inphase summation signal output by a 180-degree hybrid connected to at least t w antenna elements of at least one antenna array within said directional antenna module is output by said directional antenna module,
    wherein said at least one antenna array comprises antenna elements formed by:

a first antenna array comprising loaded loop antennas arranged in front of a first reflector plate and used in a first frequency range, and a second antenna array comprising dipole antennas arranged in front of a second reflector plate and used in a second frequency range, and wherein said antenna elements comprise a predetermined directivity to generate a main lobe and said first reflector plate is a square reflector plate:

pivoting the directional antenna module until the inphase summation signal output by the directional antenna module reaches a maximum;

switching said directional antenna module in response to the direction finding mode control signal (DFM-CRT L to a minimum direction finding mode, wherein an out-of-phase summation signal output by said 180-degree hybrid connected to the at least two antenna elements of said at least one antenna array within the directional antenna module is output by said directional antenna module;

pivoting the directional antenna module until the out-of-phase summation signal output by said directional antenna module reaches a minimum indicating a bearing of the signal source.

* * * * *